(12) United States Patent
Hilgert

(10) Patent No.: US 7,468,488 B1
(45) Date of Patent: Dec. 23, 2008

(54) CONNECTION MECHANISM FOR COUPLING A POWER MODULE TO AN ELECTRICAL BUSWAY

(75) Inventor: Brian L. Hilgert, Penn Hills, PA (US)

(73) Assignee: Universal Electric Corporation, Canonsburg, PA (US)

(*) Notice: Subject to any disclaimer, the term of this patent is extended or adjusted under 35 U.S.C. 154(b) by 0 days.

(21) Appl. No.: 11/759,693

(22) Filed: Jun. 7, 2007

(51) Int. Cl.
*H02G 3/04* (2006.01)

(52) U.S. Cl. .................. 174/95; 174/480; 174/481; 174/96; 174/101; 52/220.3; 439/207

(58) Field of Classification Search .......... 174/480, 174/481, 494, 50, 58, 60, 67, 95, 96, 101; 220/3.2, 3.8, 4.02, 242, 3.3, 3.92, 3.94; 52/220.3, 52/220.7, 220.1, 220.5; 439/215, 120, 207, 439/209, 211
See application file for complete search history.

(56) References Cited

U.S. PATENT DOCUMENTS

| | | | | |
|---|---|---|---|---|
| 5,086,194 | A * | 2/1992 | Bruinsma | 174/494 |
| 5,336,849 | A * | 8/1994 | Whitney | 174/72 C |
| 5,486,650 | A * | 1/1996 | Yetter | 174/53 |
| 5,614,695 | A * | 3/1997 | Benito Navazo | 174/480 |
| 5,685,113 | A * | 11/1997 | Reuter et al. | 52/220.7 |
| 5,861,576 | A * | 1/1999 | Langston et al. | 174/481 |
| 5,998,732 | A * | 12/1999 | Caveney et al. | 174/481 |
| 6,039,584 | A | 3/2000 | Ross | |
| 6,105,741 | A | 8/2000 | Ross | |
| 6,296,498 | B1 | 10/2001 | Ross | |
| 6,384,336 | B1 * | 5/2002 | VanderVelde et al. | 174/95 |
| 6,517,363 | B2 | 2/2003 | Ross | |
| 6,521,837 | B2 | 2/2003 | Hilgert et al. | |

OTHER PUBLICATIONS

StarLine Track Busway Catalog, Compact Series 40, 50, 60 Amp, pp. 1.2 to 1.24.

* cited by examiner

*Primary Examiner*—Dhiru R Patel
(74) *Attorney, Agent, or Firm*—Stephen A. Bucchianeri; Eckert Seamans Cherin & Mellott, LLC

(57) ABSTRACT

A connection mechanism for coupling a power module to an electrical busway is provided. The connection mechanism has a cam mechanism having a number of pivotable members. Each of the pivotable members has a generally horizontal extending shoulder portion that is coupled to a generally downwardly extending arm portion. A lower portion of the arm portion has a generally outwardly extending barb portion. The barb portion is structured to engage a barb of a base plate. A connection mechanism in combination with a power module for an electrical busway coupled to a base plate is also provided.

45 Claims, 8 Drawing Sheets

CONNECTION MECHANISM FOR COUPLING A POWER MODULE TO AN ELECTRICAL BUSWAY

FIELD OF THE INVENTION

The invention generally relates to a connection mechanism for coupling a power module to an electrical busway.

BACKGROUND INFORMATION

Typical electrical busways are an electrical distribution track that is comprised of an elongated housing containing a plurality of electrically isolated conductive busbars encased in an insulator. Sections of busway can be joined together to form runs for power distribution. When two sections of busway are joined, an electrical connection between the two separate sections is made by a connector body unit. The connector body unit acts as a bridge between the two separate sections of busway.

Standard power modules with plug-in units are designed for insertion into the electrical busway for electrical engagement with the busbars. The standard power modules have connection mechanisms that are appendages to the electrical busway sections and have a significant form factor. A problem that exists in the art is that the connection mechanism of the power module is not integrated into the profile of the electrical busway. The prior art appendage approach increases the overall footprint of the electrical busway in combination with the connection mechanism of the power module.

For example, power modules may be snapped into mechanical engagement with an electrical busway. The Universal Electric B50 busway product is a typical example of an electrical busway that is structured to receive snap-on power modules. The power modules have a metal strap formed out of spring steel. When inserting the power module, the metal strap contains barbs that snap into ribs formed in the housing of the electrical busway. Once the power module is installed, tabs of the metal strap protrude from the electrical busway. This protrusion increases the overall footprint of the power module in combination with the electrical busway. The power module may be removed from the electrical busway by squeezing the tabs of the power module. When the tabs of the power module are squeezed, the barbs of the power module are moved away from the ribs of the electrical busway housing. Significant force is needed to squeeze in the tabs of this power module. As such, this power module is difficult to remove from the electrical busway in certain circumstances.

Alternatively, power modules may be mechanically fastened to an electrical busway. The power module is generally plugged into the electrical busway and supported by fasteners that thread into the electrical busway. Fasteners are used on one or both sides of the power module to mechanically connect the power module to the electrical busway. The fasteners are usually a separate component from the power module and can easily be misplaced or lost during installation. Also, it is possible for the installer to neglect to install the fasteners.

It is, therefore, desirable to provide a connection mechanism for coupling a power module to an electrical busway that is integrated into the profile of the electrical busway.

It is, therefore, also desirable to provide a connection mechanism for coupling a power module to an electrical busway that may be coupled and removed from the electrical busway.

It is, therefore, additionally desirable to provide a connection mechanism for coupling a power module to an electrical busway that does not use an elaborate fastener framework for coupling the power module direct to the electrical busway.

Accordingly, there is room for improvement in connection mechanisms for coupling power modules to electrical busways that improve upon the systems described above.

SUMMARY OF THE INVENTION

An object of the invention is to provide a connection mechanism for coupling a power module to an electrical busway that is integrated into the profile of the electrical busway.

Another object of the invention is to provide a connection mechanism for coupling a power module to an electrical busway that may be coupled and removed from the electrical busway.

Another object of the invention is to provide a connection mechanism for coupling a power module to an electrical busway that does not use an elaborate fastener framework for coupling the power module direct to the electrical busway.

Certain objects of the invention are achieved by a connection mechanism for coupling a power module to an electrical busway. The connection mechanism has a cam mechanism having a number of pivotable members. Each of the pivotable members has a generally horizontal extending shoulder portion that is coupled to a generally downwardly extending arm portion. A lower portion of the arm portion has a generally outwardly extending barb portion. The barb portion is structured to engage a barb of a base plate.

Other objects of the invention are achieved by a connection mechanism in combination with a power module for an electrical busway coupled to a base plate. The combination has a holder with an aperture provided therein and a number of posts provided thereon. A plug-in adapter is received within the aperture of the holder. A cam mechanism is coupled to at least one of the number of posts. The plug-in adapter has a number of electrical contacts that are structured to engage the electrical busway. The cam mechanism has a number of pivotable members. Each of the pivotable members has a generally horizontal extending shoulder portion that is coupled to a generally downwardly extending arm portion. A lower portion of the arm portion has a generally outwardly extending barb portion. The barb portion is structured to engage a barb of the base plate. The holder and the cam mechanism are coupled to a cover plate. The base plate and the cover plate define a power channel with the plug-in adapter and the cam mechanism located within the power channel.

Other objects of the invention will be readily apparent from the following description and claims.

DESCRIPTION OF THE PREFERRED EMBODIMENTS

Figure 1:
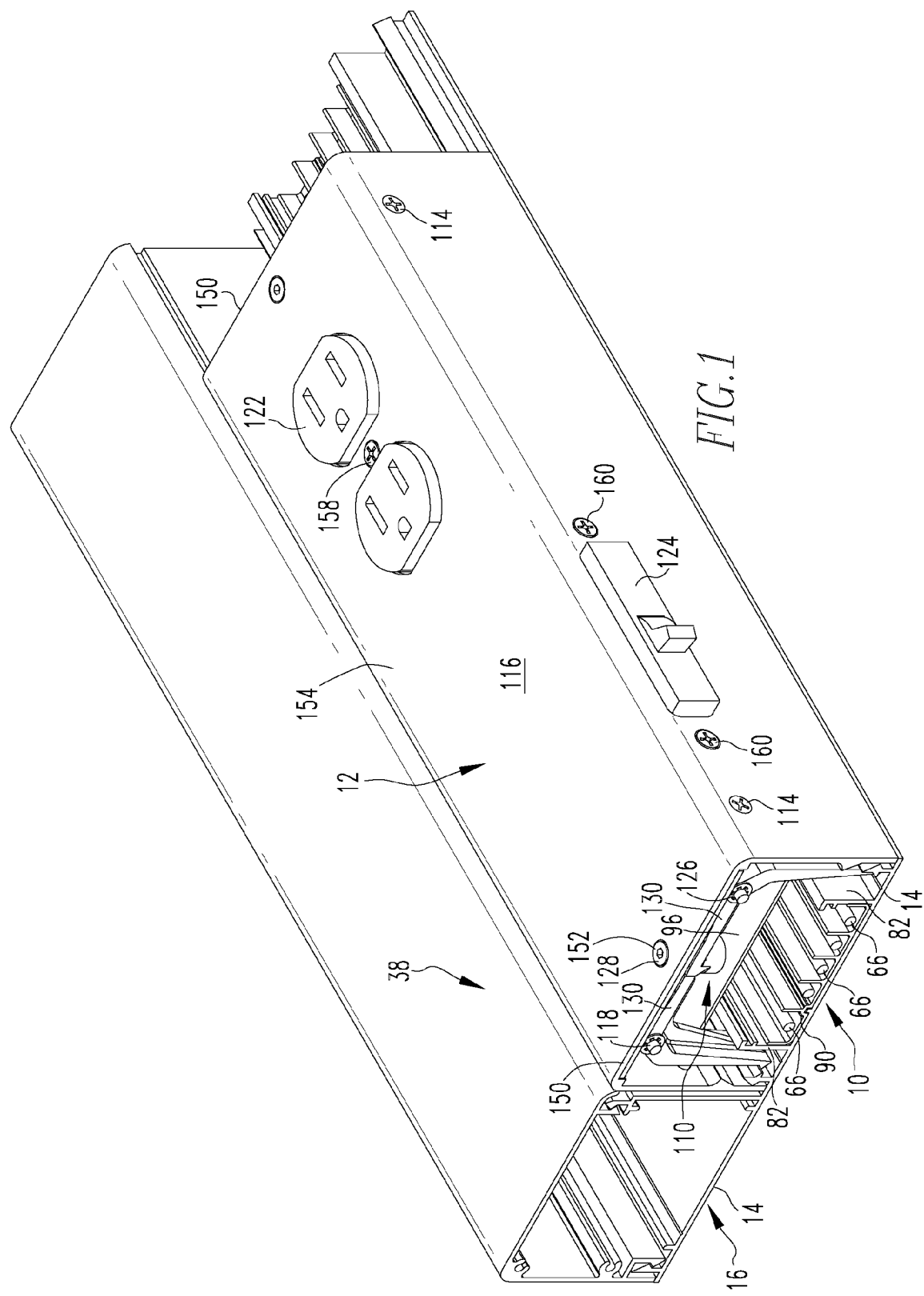
FIG. 1 is a top isometric view of an electrical busway, a power module and an integrated raceway of the invention.

For purposes of the description hereinafter, the terms "upper", "lower", "vertical", "horizontal", "axial", "top", "bottom", "aft", "behind", and derivatives thereof shall relate to the invention as it is oriented in the drawing FIGS. or as it is oriented when it is coupled to a flat and level horizontal surface. However, it is to be understood that the invention may assume various alternative configurations when the invention is moved about or the invention, for example, is attached to a vertical wall. It is also to be understood that the specific elements illustrated in the FIGS. and described in the following specification are simply exemplary embodiments of the invention. Therefore, specific dimensions, orientations and other physical characteristics related to the embodiments disclosed herein are not to be considered limiting.

As used herein, the term "fastener" means any suitable fastening, connecting or tightening mechanism such as dowel pins, fasteners, rivets, screws and the like. As used herein, the term "number" shall mean one or an integer greater than one (i.e., a plurality). As used herein, the statement that two or more parts are "attached", "connected", "coupled", or "engaged" together shall mean that the parts are joined together either directly or joined through one or more intermediate parts. As used herein, the term "data transport device" means data and/or communication cables, optical fiber, strands, wires and the like.

Figure 2:
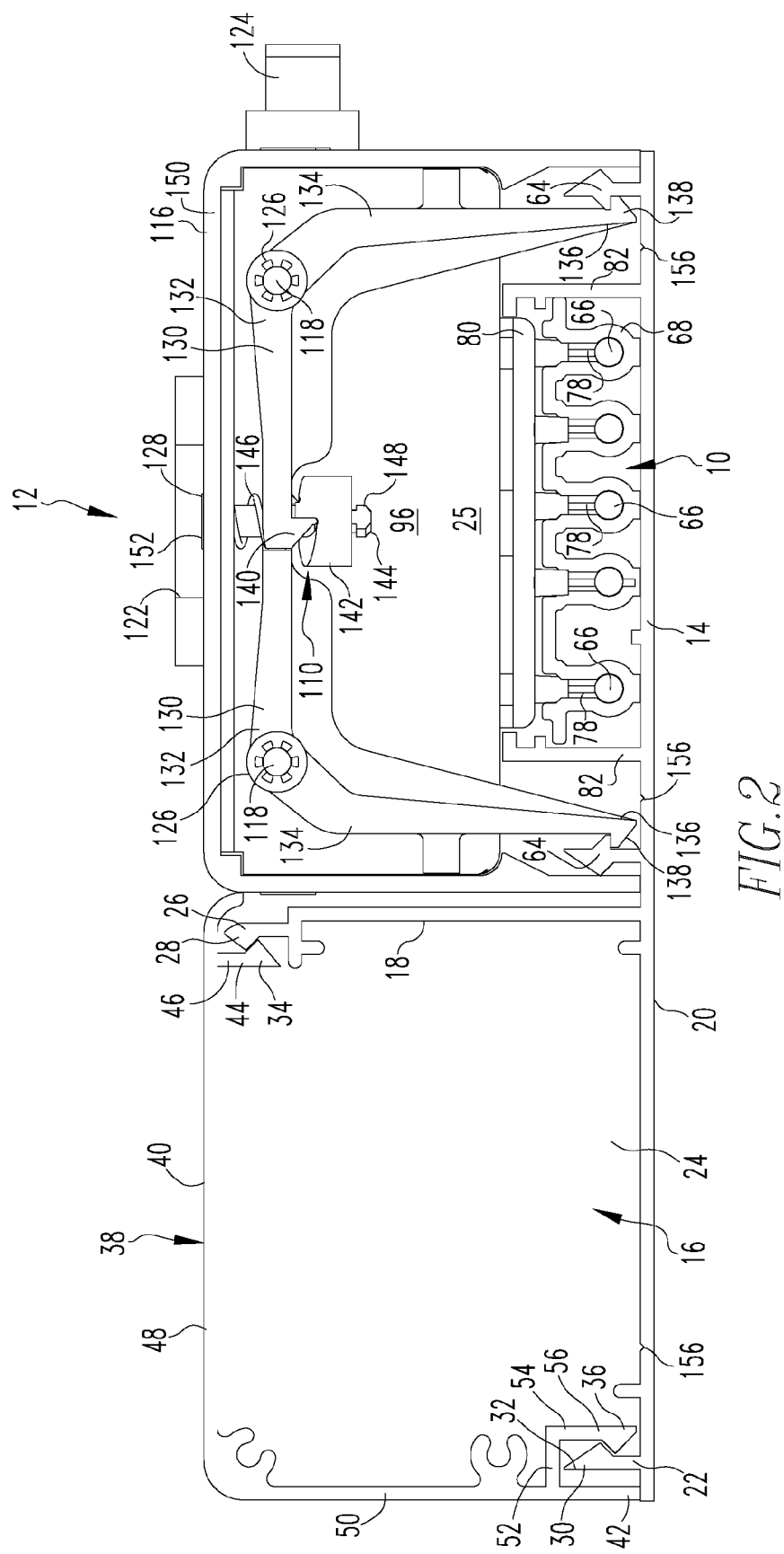
FIG. 2 is a side view of the electrical busway, the power module and the integrated raceway shown in FIG. 1.

FIGS. 1 and 2 show an electrical busway 10 with a power module 12 coupled thereto. The electrical busway 10 is coupled to a base plate 14. A data channel 16 is defined between the base plate 14 of the electrical busway 10 and a cover plate. If provided, the data channel 16 is located adjacent to or proximate to the base plate 14. The data channel 16 is structured to receive a number of data transport devices therein. When the base plate 14 provides for the data channel 16 and the electrical busway 10 is coupled to the base plate 14, the occurrence of complicated installations and related labor installation costs is reduced that are associated with prior art wire trays that are separate components mechanically attached to electrical busways with fasteners.

With reference to FIG. 2, a first wall portion 18 extends generally upwardly from the base plate 14. The base plate 14 has a bottom end 20. The first wall portion 18 is structured to shield any data transport devices contained within the data channel 16 from electromagnetic flux ("EMF") that may be generated in a channel of the electrical busway 10 located proximate to the data channel 16. The first wall portion 18 can be made from any suitable material now known in the art or developed in the future that would shield data transport devices contained within the data channel 16 from EMF generated in the channel of the electrical busway 10. A second wall portion 22 extends generally upwardly from the base plate 14. The first wall portion 18 and the second wall portion 22 oppose each other and define a receptacle 24 for receiving data transport devices within the data channel 16.

An individual power channel 25 is provided for supplying power distribution by electrically isolated electrical conductors. An individual data channel 16 is provided for routing data transport devices. The power channel 25 is defined between the base plate 14 of the electrical busway 10 and a cover plate. The power channel 25 is located adjacent to or proximate to the base plate 14 and proximate to the data channel 16. The power channel 25 is structured to receive the electrical busway 10 therein. The data channel 16 and the power channel 25 extend in generally parallel directions with respect to each other. The first wall portion 18 separates data channel 16 from power channel 25. The base plate 14 for the data channel 16 has the electrical busway 10 coupled to the base plate 14. The base plate 14 is an integral or unitary component when the data channel 16 and the power channel 25 are provided. The data channel 16 and the power channel 25 forms a portion of a data and power distribution system of the invention.

An upper end 26 of the first wall portion 18 has an arcuate tip or barb 28 formed therein. Likewise, an upper end 30 of the second wall portion 22 has a barb or arcuate tip 32 formed therein. The arcuate tip 28 and the barb 32 are structured to receive barbs 34, 36 of a cover 38 in order to close data channel 16 once a preselected number of data transport devices have been received within the data channel 16. The cover 38 has a general L-shaped configuration in cross-section. Data jacks, data ports, data distribution receptacles, etc. (not shown) may be provided within recesses (not shown) in the cover 38. The data jacks, etc. would be in data communication with a number of the data transport devices located within the data channel 16.

Barb 34 is located proximate to an upper end 40 of the cover 38 and barb 36 is located proximate to a bottom end 42 of the cover 38. Barb 34 is located at a lower end 44 of a generally downwardly extending third wall portion 46. Third wall portion 46 is coupled to an upper generally horizontal surface 48 which is coupled to a generally downwardly extending fourth wall portion 50. A lower generally horizontal segment 52 is coupled to the fourth wall portion 50 at a location proximate to the bottom end 42 of the cover 38. A generally downwardly extending fifth wall portion 54 is coupled to the lower horizontal segment 52. Barb 36 is located at a lower end 56 of the fifth wall portion 54.

Figure 3:
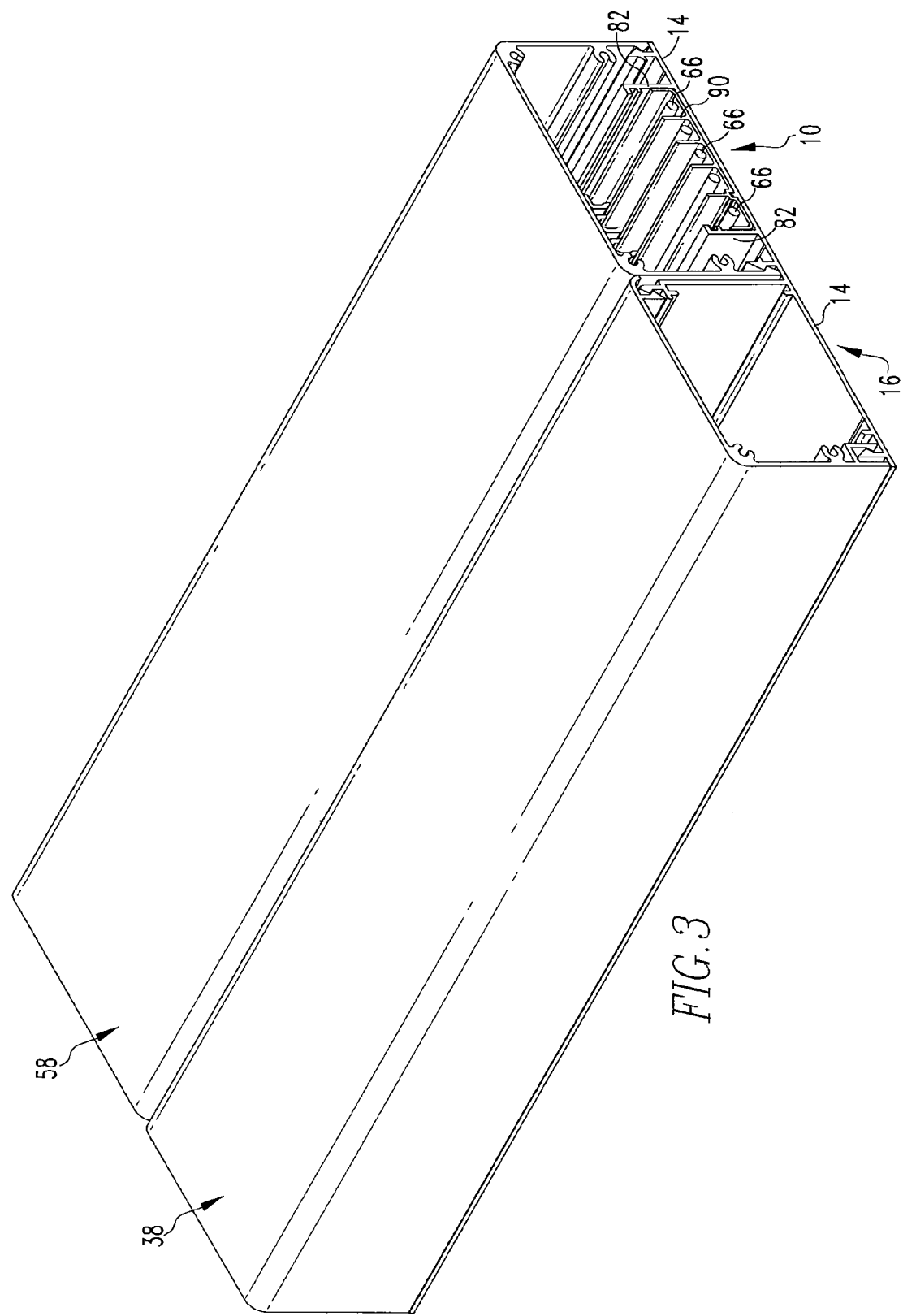
FIG. 3 is a top isometric view of the electrical busway and the integrated raceway of the invention with plain covers coupled to the electrical busway and the integrated raceway.
Figure 4:
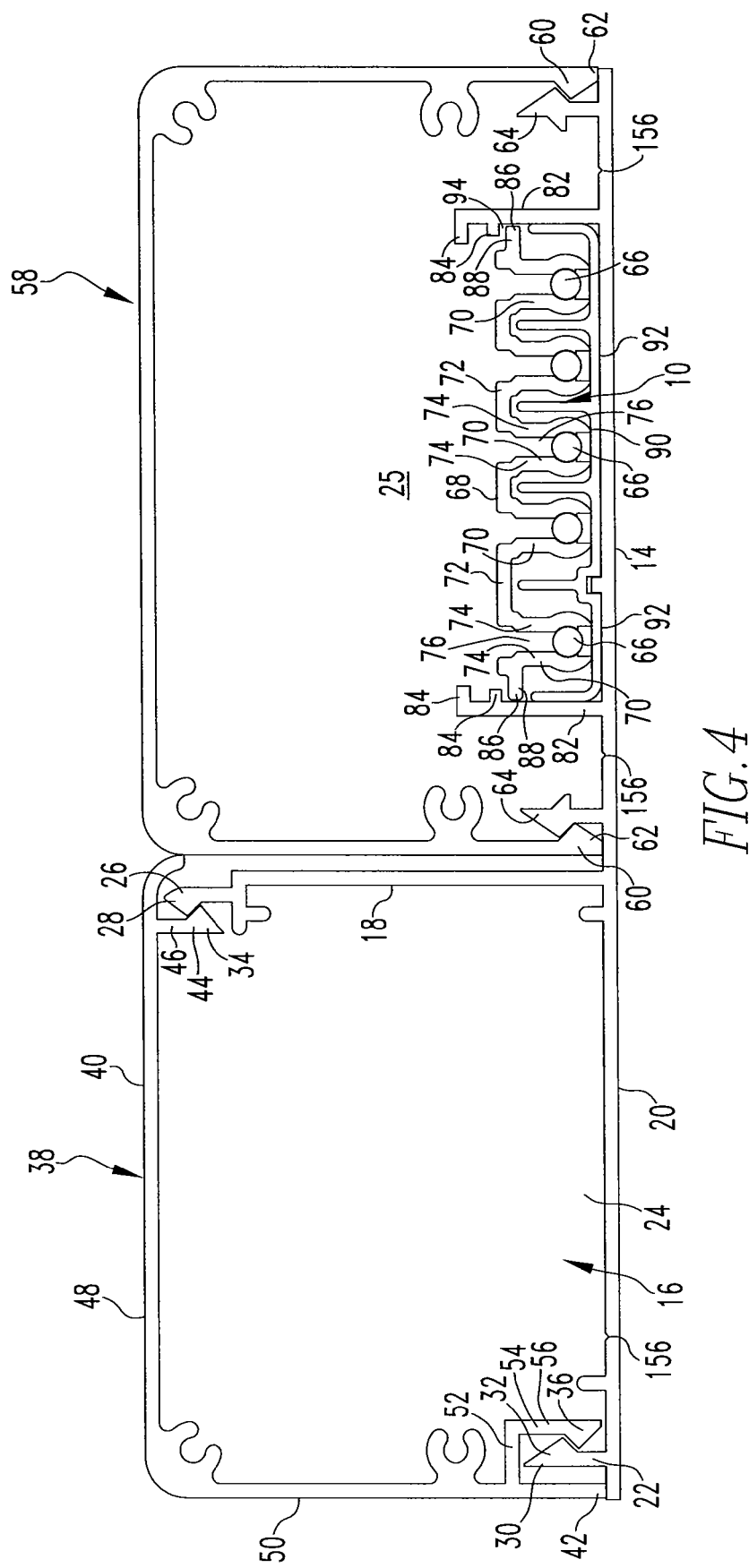
FIG. 4 is a side view of the electrical busway and the integrated raceway with plain covers shown in FIG. 3.

With reference to FIGS. 3-4, the electrical busway 10 is shown enclosed by a plain cover 58. With reference to FIG. 4, cover 58 would be coupled to base plate 14 via barbs 60 formed in a lower end 62 of the cover 58 and barbs 64 formed in the base plate 14. Cover 58 does not have any plug-in units and/or breaker units. Cover 58 would be used in those circumstances where plug-in units and/or breaker units are not needed by the end-user in certain sections of electrical busway 10. Cover 58 would be used in those circumstances where only power transmission is desired along the electrical busway 10. The cover 58 has an inverted generally U-shaped configuration in cross-section.

With reference to FIGS. 3-4, the electrical busway 10 is shown without the power module 12 coupled thereto. With reference to FIG. 4, the electrical busway 10 consists of a number of electrical conductors or busbars 66 that extend along a length of the base plate 14. The electrical conductors 66 are typically made from a rigid conductive material such as copper, for example. In alternative embodiments, the electrical conductors 66 could be made from other conductive materials such as other conductive metals for example. The electrical conductors 66 are structured for carrying electricity between a source and a load.

The electrical conductors 66 are located within or coupled to an insulator 68. The insulator is made from electrically resistive material, such as plastic, for example. The insulator 68 includes a number of general U-shaped portions 70 at least some of which are structured to receive one of the number of electrical conductors 66. Each U-shaped portion 70 is coupled to an adjacent U-shaped portion 70 by an insulator generally horizontal segment 72. Each U-shaped portion 70 has a pair of opposed wall sections 74 that define a recess 76 for receiving an electrical contact 78 (FIG. 2) from a plug-in adapter 80 (FIG. 2) which will be described in greater detail below.

The base plate 14 has a pair of generally upwardly extending wall portions 82 in opposed relation to each other that have a number of generally inwardly extending tab portions 84 in opposed relation to each other. One of the number of opposed tab portions 84 is structured to receive the insulator 68 and electrical conductors 66. Peripheral edges 86 of the insulator 68 have flanges 88 formed therein which are structured to be enclosed by one of the number of opposed tab portions 84.

The electrical busway 10 may also have a joint insulator 90 which is typically used at an end of an electrical busway 10 section. The joint insulator 90 insulator includes a number of general U-shaped portions 92. At least some of the U-shaped portions 92 are structured to receive one of the number of electrical conductors 66. Each of the number of electrical conductors 66 are located within or coupled to general U-shaped portions 70 of the insulator 68.

The combination of the electrical conductors 66 and the insulators 68 or the combination of the electrical conductors 66, the insulators 68 and the joint insulator 90 may be slidably disposed within a channel 94 defined by one of the number of opposed tab portions 84.

Figure 5:
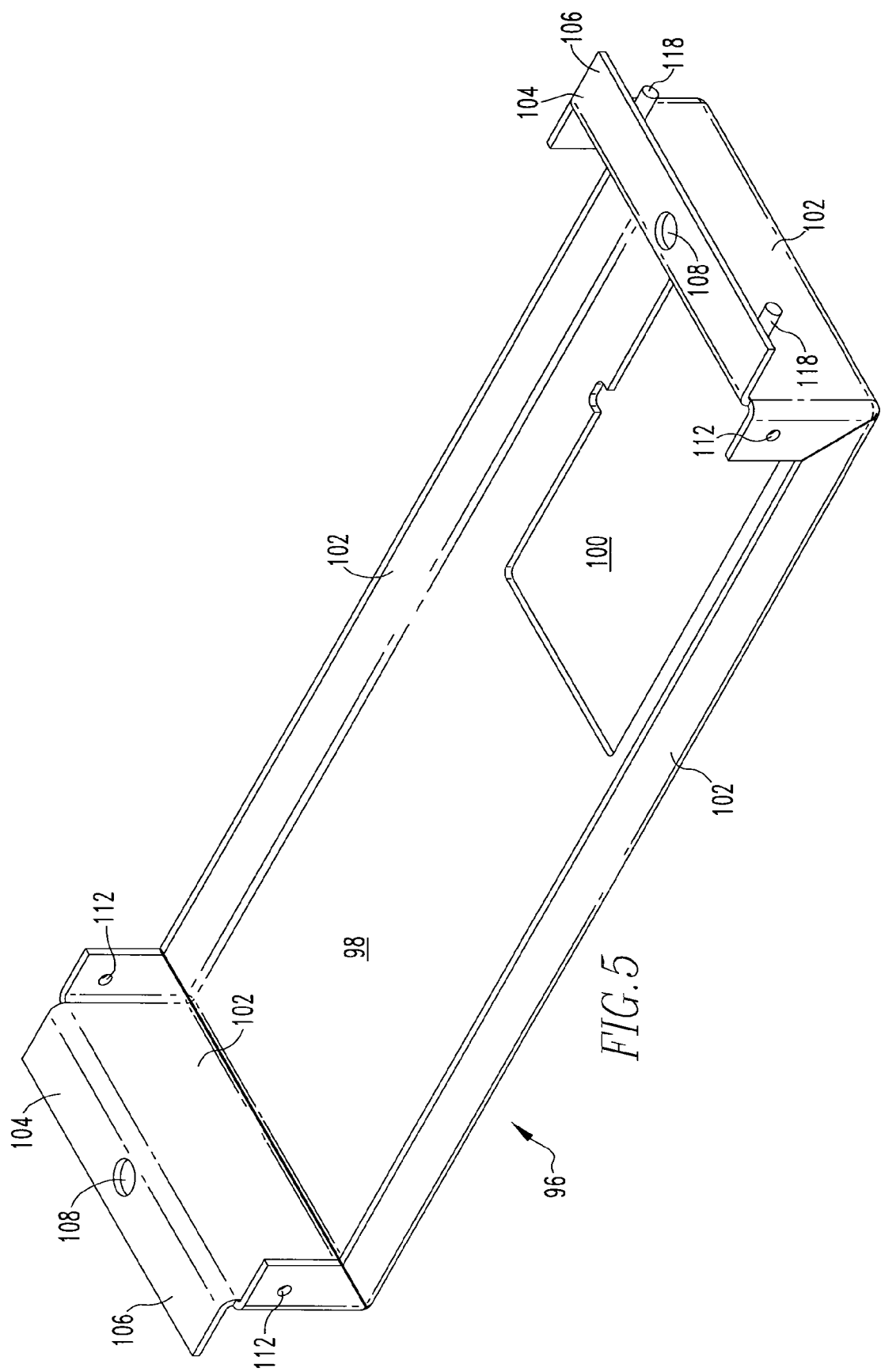
FIG. 5 is a top isometric view of a holder of the invention without the plug-in adapter, connection mechanisms and cover coupled thereto.
Figure 6:
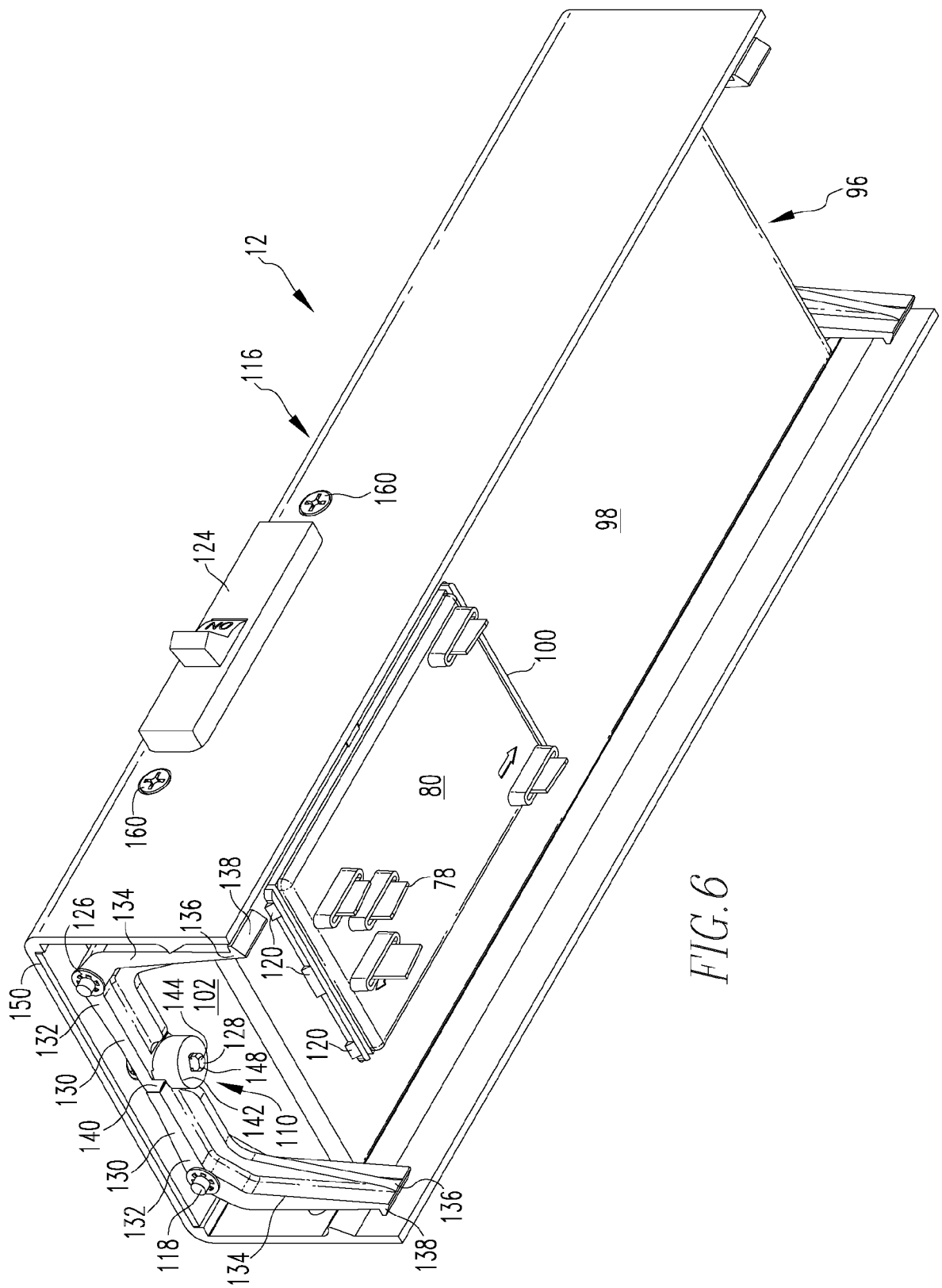
FIG. 6 is a bottom isometric view of the power module of the invention.
Figure 7:
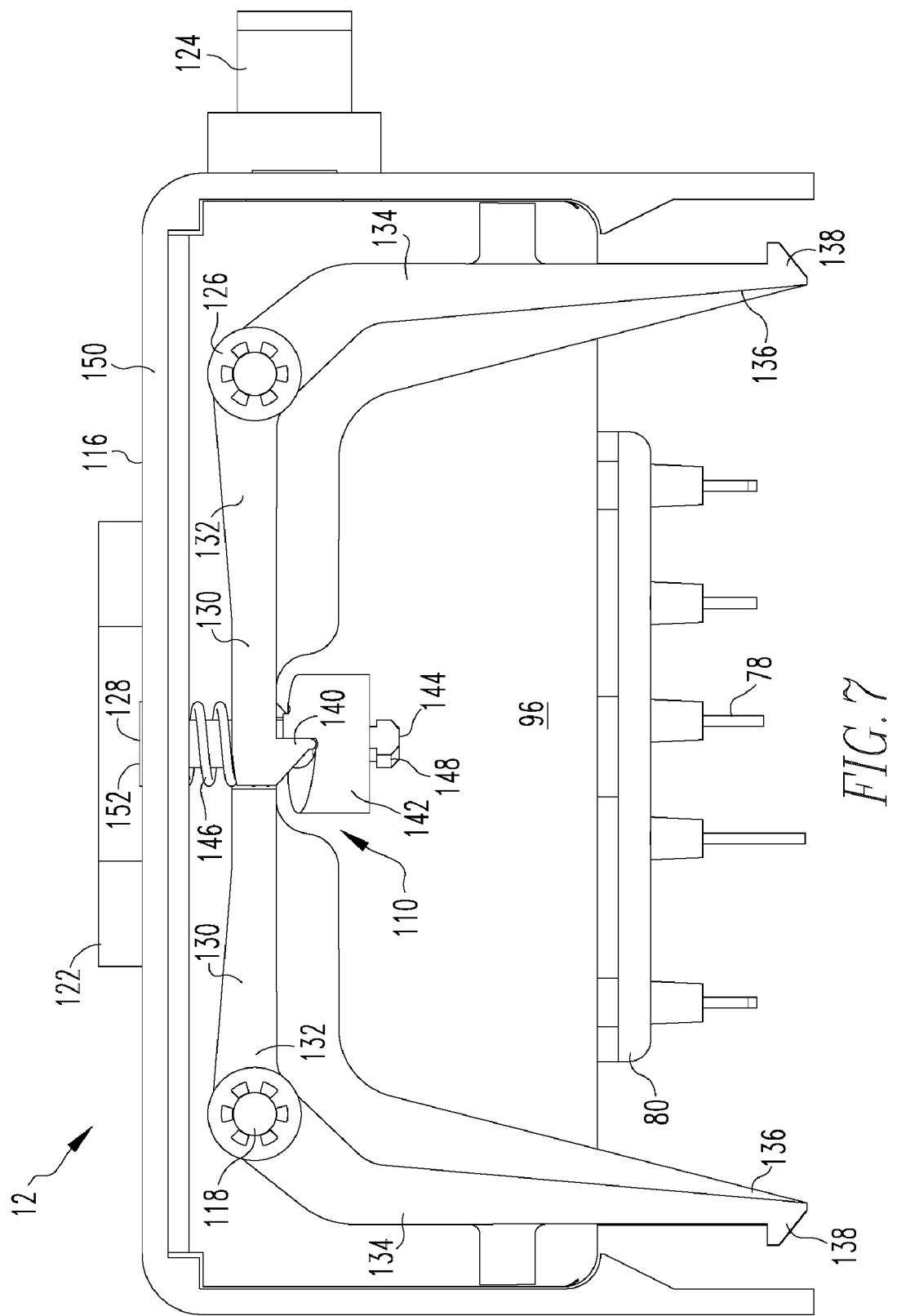
FIG. 7 is a side view of the power module shown in FIG. 6.

With reference to FIGS. 1-2, the power module 12 is shown coupled to the electrical busway 10. While FIGS. 1-2 also show data channel 16, it is to be noted that in certain embodiments, the data channel 16 is not provided and should not be considered as a limitation of the invention. With reference to FIG. 5, the power module 12 includes a holder 96. The holder 96 has a base 98 with an aperture 100 provided therein. The aperture 100 is structured to receive the plug-in adapter 80 (FIG. 6). The base 98 has a number of walls 102 extending generally upwardly from the base 98. In the depicted embodiment, each of the number of walls 102 stands in opposed relation to one of the other walls 102, but such a depiction should not be considered a limitation of the invention.

An upper end 104 of the holder 96 has generally horizontal extending flanges 106. The flanges 106 are coupled to at least one of the number of walls 102. The flanges 106 are located in opposed relation to each other. Each of the flanges 106 has an aperture 108 formed therein for receiving a fastener to couple a cam mechanism 110 (FIGS. 1-2 and 6-7) thereto which is described in greater detail below. The cam mechanism 110 allows the power module 12 to be quickly attached and quickly disconnected from the electrical busway 10. The cam mechanism 110 is a connection mechanism.

Some of the number of walls 102 may have a number of apertures 112 formed therein. The apertures 112 are structured to receive fasteners 114 (FIG. 1) in order to couple the holder 96 to cover plate 116. (FIG. 1). Alternatively, some of the number of walls 102 may have a number of projections (not shown) provided thereon that are structured to engage a number of recesses (not shown) provided in the cover plate 116 in order to couple the holder 96 to cover plate 116 in a different coupling manner. For example, FIG. 6 shows holder 96 coupled to cover plate 116 without a number of fasteners 114. Some of the number of walls 102 may have a number of posts 118 provided thereon that are structured to be coupled to the cam mechanism 110 (FIGS. 1-2 and 6-7) which is described in greater detail below. The cover plate 116 has an inverted generally U-shaped configuration in cross-section.

With reference to FIG. 6, a portion of the plug-in adapter 80 is shown removably disposed within the aperture 100. The electrical contacts 78 extend downwardly from the plug-in adapter 80 and are structured to engage the electrical conductors 66 and the electrical busway 10. The plug-in adapter 80 is captured within the aperture 100 by a number of tabs 120 which may be physically actuated by an end-user to permit removal of the plug-in adapter 80 from the aperture 100 if desired. A number of wires (not shown) are typically coupled to the electrical contacts 78 of the plug-in adapter 80. Such wires (not shown) are then also coupled to corresponding terminals (not shown) of a plug-in unit 122 (FIGS. 1-2 and 7) and/or a switch or circuit interrupter 124 (FIGS. 1-2 and 6-7). The wires enable electrical communication between the plug-in adapter 80, the plug-in unit 122 and the switch or circuit interrupter 124.

With reference to FIGS. 1-2 and 6-7, the cam mechanism 110 is shown coupled to or mounted on at least one or some of the number of posts 118 passing through apertures of the cam mechanism 110 which couples the cam mechanism 110 to the holder 96. The cam mechanism 110 may be secured to posts 118 with a number of washers 126. The cam mechanism 110 is also coupled to a rotatable fastener 128 which passes through an aperture in the cam mechanism 110.

The cam mechanism 110 is constructed of a number of pivotable members 130. In the depicted embodiment, two pivotable members 130 are shown. The combination of the two pivotable members 130 has an inverted generally U-shaped configuration in cross-section. Each of the pivotable members 130 has a generally horizontal extending shoulder portion 132 coupled to a generally downwardly extending arm portion 134. A lower portion 136 of the arm portion 134 has a generally outwardly extending barb portion 138. The barb portions 138 are structured to engage barbs 64 of the base plate 14.

One of the pivotable members 130 has a sloped nib 140 that is structured to be rotatably moved by actuation of rotatable fastener 128. A sloped member 142 is located proximate to a lower end 144 of the rotatable fastener 128 and is disposed around a portion of a shank of the rotatable fastener 128. The sloped nib 140 engages the sloped member 142. The rotatable fastener 128 passes through an aperture provided in the cover plate 116, the aperture 108 provided in the holder 96, a biasing member 146, an aperture provided in one of the pivotable members 130 and an aperture provided in the sloped member 142. The rotatable fastener 128 may be press fit through the aperture provided in the sloped member 142. The lower end 144 of the rotatable fastener 128 may have an enlarged head 148. After press fitting the rotatable fastener 128 through the aperture of the sloped member 142, the sloped member 142 may be partially rotated about the rotatable fastener 128 so the enlarged head 148 prevents removal of the rotatable fastener 128 from the aperture of the sloped member 142.

The pivotable members 130 are spring loaded by the biasing member 146. The power module 12 and cam mechanism 110 connection mechanism may be coupled to the electrical busway 10 by moving the power module 12 towards the electrical busway 10 by pressing downwardly upon the cover plate 116 toward the electrical busway 10 which causes the barbed portions 138 to snap under barbs 64 to firmly connect the power module 12 with the electrical busway 10. The power channel 25 is defined between the base plate 14 of the electrical busway 10 and the cover plate 116. The cam mechanism 110 connection mechanism quickly attaches the power module 12 with the electrical busway 10. Once contact is made by the power module 12 with the electrical busway 10, the power module 12 is ready to be used without any additional wiring involved. The power module 12 may be inserted into the electrical busway 10 at any point along the length of an electrical busway system.

The pivotable members 130 are integrated into opposite ends 150 and located on opposite ends 150 of the power module 12. When the cam mechanism 110 is coupled to the electrical busway 10, the cam mechanism 110 is concealed, located or wholly contained within the power channel 25 by the cover plate 116 with only a head 152 of the rotatable fastener 128 being visible on an exterior surface 154 of the cover plate 116. Also, when the cam mechanism 110 is coupled to the electrical busway 10, the plug-in adapter 80 and the holder 96 is concealed, located or wholly contained within the power channel 25 by the cover plate 116. As can be seen in FIG. 1, the power module 12 has a relatively smooth appearance on the exterior surface 154 of the cover plate 116 which provides the power module 12 with an aesthetically appealing appearance to the end-user as compared to the prior art. The power module 12 coupled to the electrical busway 10 also has a reduced form factor as compared to the prior art.

Also, cover 38 and cover plate 116 (FIG. 1) and the covers 38, 58 (FIG. 3) provide the base plate 14 for the data channel 16 with the electrical busway 10 coupled to the base plate 10 with an aesthetically pleasing appearance that avoids the bulky appearance found in the prior art of a wire tray mechanically connected to an electrical busway. Such an approach also reduces the overall footprint of the base plate 14 for the data channel 16 with the electrical busway 10 coupled to the base plate 10.

Furthermore, as an additional benefit, the base plate 14 has a number of locations 156 (FIGS. 2 and 4) on the base plate 14 that are structured to receive fasteners (not shown) in order to directly attach the base plate 14 to a mounting surface such as a wall, floor or ceiling for example. Such an attachment approach is available to the electrical busway 10 whether or not the data channel 16 is provided. Such an attachment feature eliminates another problem found in the prior art which prevents electrical busways or electrical busways that may have a data channel coupled thereto from being directly mounted to a mounting surface such as a wall, floor or ceiling. Prior art busways were typically mounted in a spaced relationship from such a mounting surface with elaborate hardware. Likewise, prior art wire trays mechanically connected to electrical busways were usually mounted in a spaced relationship from such a mounting surface.

The reduced form factor of the electrical busway 10 in combination with the power module 12 of the invention allows the combination to be directly mounted to a mounting surface which eliminates the mounting problem of the prior art mentioned above. In the prior art, power module connection mechanisms projected outwardly from a cover plate as a pair of opposed actuable tabs that allowed the prior art power module connection mechanism to be connected or disconnected from an electrical busway. The problem with that approach is that the tabs extended to height above a plug-in module thereby increasing the overall footprint of the power module coupled to the electrical busway. Also, a potential problem with such an approach is that the actuable tabs could be accidentally actuated by the end-user which inadvertently disconnects the prior art power module. This accidental disconnection could potentially expose the end-user to live electrical conductors situated within the electrical busway. The cam mechanism 110 connection mechanism of this invention eliminates these problems identified above.

To remove the power module 12 and the cam mechanism 110 connection mechanism from the electrical busway 10, the end-user only needs to actuate the rotatable fastener 128. Upon actuation of the rotatable fastener 128, corresponding rotatable movement is provided to sloped member 142 which causes the sloped member 142 to rotate. The sloped member 142 has a complementary slope to the sloped nib 140 of one of the pivotable members 130. Nonetheless, the sloped nib 140 would have an interference fit with the sloped member 142 such that rotation of the sloped member 142 would provide a preselected amount or effective amount of movement in the pivotable members 130 which pulls the pivotable members 130 in and away from the barbs 64. The sloped member 142 may have indentations which are structured to provide a positive locking feature in the closed and open positions of the cam mechanism 110. Typically, the power module 12 could be removed from the electrical busway 10 by rotating the rotatable fastener 128 counterclockwise by a half turn. Such movement in the pivotable members 130 causes the barbed portions 138 to disengage from barbs 64 and permit removal of the power module 12 from the electrical busway 10. To reinstall the power module 12, the rotatable fastener 128 is rotated clockwise to reset the pivotable members 130. The power module 12 is now ready to be reinstalled. The quick removal of the power module 12 from the electrical busway 10 allows the end-user to efficiently service any of the components of the power module 12. Also, the quick removal of the power module 12 allows movement of the power module 12 to other portions of the electrical busway 10 or total removal of the power module 12 from the electrical busway 10. The power module 12 eliminates the problem of running additional wires to or removing wires from added or removed power modules that are used in standard raceway systems.

Additionally, since the power module 12 may only be removed from the electrical busway 10 by actuating the rotatable fastener 128, the power module 12 cannot be accidentally disconnected from the electrical busway 10 by the end-user. The power module 12 of the invention eliminates any potential exposure to live electrical conductors from the accidental disconnection of power modules found in the prior art.

With reference to FIG. 1, the cover plate 116 of the power module 12 has plug-in unit 122 received within a suitably sized aperture or apertures within the cover plate 116. Plug-in unit 122 may be secured to the cover plate 116 with a fastener 158. Also, the cover plate 116 of the power module 12 has switch or circuit interrupter 124 received within a suitably sized aperture within the cover plate 16. Switch or circuit interrupter 124 may be secured to the cover plate 116 with a number of fasteners 160 as well.

Figure 8:
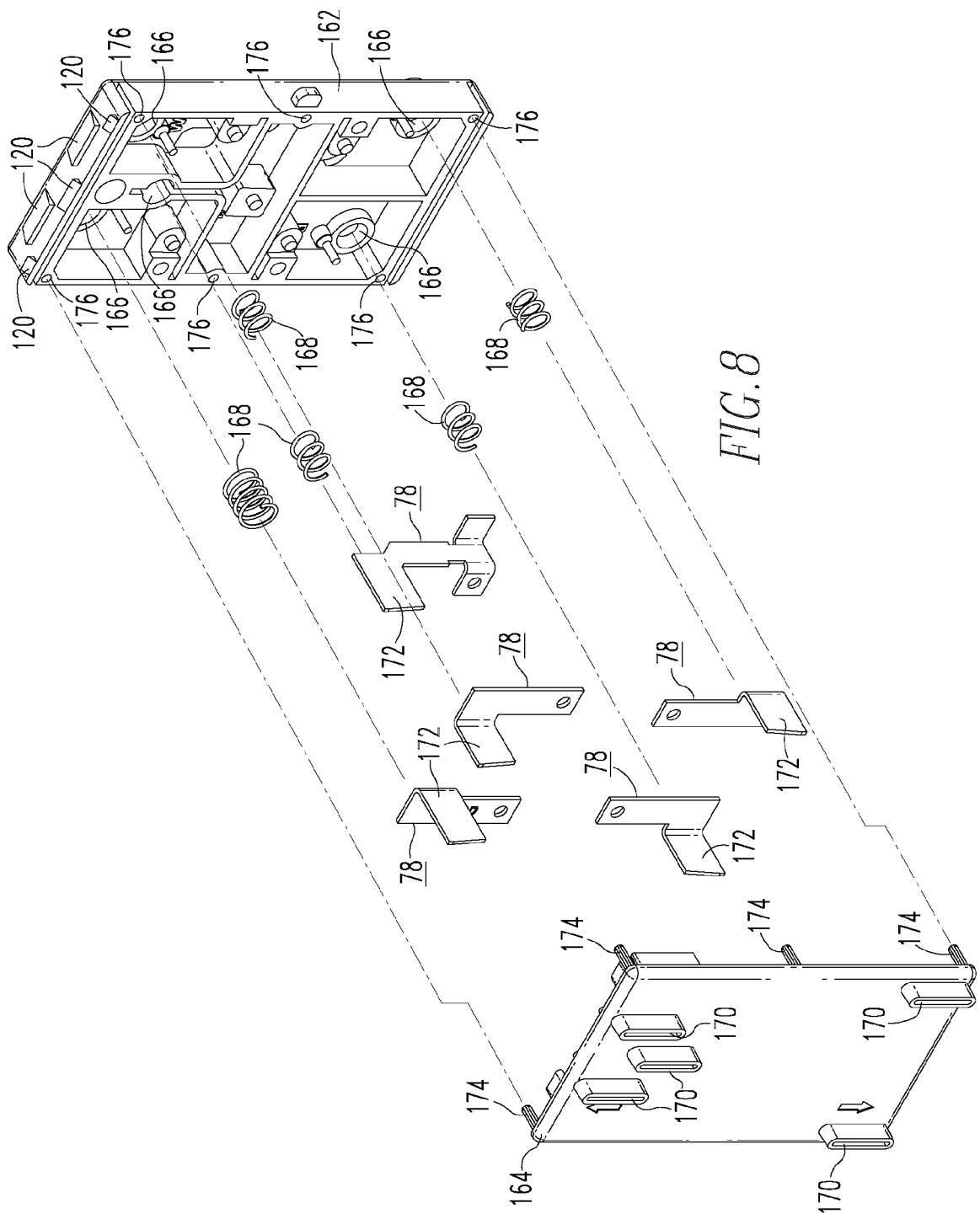
FIG. 8 is an exploded view of a plug-in adapter of the invention shown in FIGS. 2, 6 and 7.

With reference to FIG. 2, when the power module 12 is coupled to the electrical busway 10 by pressing downwardly upon the cover plate 116 toward the electrical busway 10, the electrical contacts 78 of the plug-in adapter 80 contact electrical conductors 66 of the electrical busway 10 and place the components in electrical communication with each other. With reference to FIG. 8, the plug-in adapter 80 is shown in greater detail. The plug-in adapter 80 has an upper housing 162 and a lower housing 164 that are structured to be coupled together. The upper housing 162 has tabs 120 which were previously described for captively receiving the plug-in adapter 80 within aperture 100 of the base 98. The upper housing 162 has a number of receptacles 166 disposed therein that are sized and structured to receiving a number of biasing members 168. Each of the electrical contacts 78 is structured to be coupled to one of the number of biasing members 168 to selectively bias the electrical contacts 78. Such bias allows the electrical contacts 78 to provide compressive engagement with the electrical conductors 66 of the electrical busway 10 to maintain electrical communication between the electrical conductors 66 and the electrical contacts 78. The lower housing has a number of apertures 170 suitably sized and structured to receive blades 172 of the electrical contacts 78. The plug-in adapter 80 is assembled by providing the electrical contacts 78 and biasing members 168 between the upper housing 162 and the lower housing 164 with the blades 172 protruding from the apertures 170 and the biasing members 168 received within the receptacles 166. The lower housing 164 is attached to the upper housing with posts 174 provided on the lower housing 164 received within recesses 176 provided in the upper housing 162. The electrical contacts 78 are coupled by wires (not shown) to either the plug-in unit 122 or the switch or circuit interrupter 124 so the electrical conductors 66 are in electrical communication with the plug-in unit 122 and the switch or circuit interrupter 124 when the power module 12 is coupled to the electrical busway 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended hereto and any and all equivalents thereof.

What is claimed is:

1. A connection mechanism for coupling a power module to an electrical busway comprising:
    a cam mechanism having a number of pivotable members,
    wherein each of the pivotable members has a generally horizontal extending shoulder portion coupled to a generally downwardly extending arm portion,
    wherein a lower portion of the arm portion has a generally outwardly extending barb portion, and
    wherein the barb portion is structured to engage a barb of a base plate.

2. The connection mechanism of claim 1 wherein the cam mechanism further comprises a sloped member located proximate to a lower end of a rotatable fastener that is disposed around a portion of a shank of the rotatable fastener,
    wherein the rotatable fastener passes through an aperture provided in a cover plate,
    wherein the rotatable fastener passes through an aperture in a flange of a holder,
    wherein the rotatable fastener passes through a biasing member,
    wherein the rotatable fastener passes through an aperture provided in one of the pivotable members, and
    wherein the rotatable fastener passes through an aperture provided in the sloped member.

3. The connection mechanism of claim 2 wherein the pivotable members are spring loaded by the biasing member, and
    wherein the connection mechanism causes the barb portion of each of the number of pivotable members to snap under the corresponding barb of the base plate when the connection mechanism is moved towards the electrical busway.

4. The connection mechanism of claim 1 wherein the pivotable members are located on opposite ends of the power module.

5. The connection mechanism of claim 1 wherein the cam mechanism further comprises:
    a sloped member located proximate to a lower end of a rotatable fastener; and
    a sloped nib provided on one of the pivotable members that engages the sloped member,
    wherein the sloped member is disposed around a portion of a shank of the rotatable fastener.

6. The connection mechanism of claim 5 wherein actuation of the rotatable fastener provides corresponding rotatable movement to the sloped member, and
    wherein rotatable movement of the sloped member provides an effective amount of movement in each of the number of pivotable members to pull each of the number of pivotable members away from the corresponding barb of the base plate and disengage the connection mechanism from the electrical busway.

7. The connection mechanism of claim 5 wherein the sloped member has indentations which are structured to provide a locking feature.

8. The connection mechanism of claim 1 wherein the power module has a holder with an aperture provided therein and a number of posts provided thereon, wherein a plug-in adapter is received within the aperture of the holder, wherein the plug-in adapter has a number of electrical contacts, each of the number of electrical contacts is structured to be electrically connected to a conductor of the electrical busway, wherein the connection mechanism is coupled to at least one of the number of posts, wherein the holder and the connection mechanism are coupled to a cover plate, wherein the base plate and the cover plate define a power channel, and wherein the plug-in adapter and the connection mechanism are located within the power channel.

9. The connection mechanism of claim 8 wherein the holder has a base with the aperture provided therein,
    wherein the base has a number of walls extending generally upwardly from the base,
    wherein an upper end of the holder has generally horizontal extending flanges,
    wherein each of the flanges is coupled to one of the number of walls,
    wherein each of the flanges has an aperture formed therein for coupling one of a number of connection mechanisms thereto,
    wherein some of the number of walls have posts provided thereon, and
    wherein the holder is located within the power channel.

10. The connection mechanism of claim 9 wherein each of the number of walls stands in opposed relation to one of the other walls, and
    wherein the flanges are located in opposed relation to each other.

11. The connection mechanism of claim 8 wherein the plug-in adapter is captured within the aperture by a number of tabs which may be actuated to permit removal of the plug-in adapter from the aperture.

12. The connection mechanism of claim 8 further comprising:
    a plug-in unit received within apertures within the cover plate;
    a switch or circuit interrupter received within another aperture within the cover plate; and
    a number of wires coupled to the plug-in adapter and one of the plug-in unit and the circuit interrupter.

13. The connection mechanism of claim 8 wherein the base plate has a number of locations on the base plate that are structured to receive fasteners in order to directly attach the base plate to a mounting surface.

14. The connection mechanism of claim 13 wherein the mounting surface is selected from the group consisting of a wall, a floor and a ceiling.

15. The connection mechanism of claim 8 wherein the plug-in adapter has an upper housing and a lower housing that are structured to be coupled together, wherein the upper housing has tabs for captivity receiving the plug-in adapter within the aperture of the holder, wherein the upper housing has a number of receptacles provided therein that are structured to receive a number of biasing members, wherein each of the electrical contacts is structured to be coupled to one of the number of biasing members to selectively bias the electrical contacts, wherein the lower housing has a number of apertures, and wherein each of the apertures is structured to receive a blade of each of the electrical contacts.

16. The connection mechanism of claim 15 wherein the electrical contacts and the biasing members are provided between the upper housing and the lower housing, wherein the blades protrude from the apertures in the lower housing, wherein the biasing members are received within the receptacles of the upper housing, and wherein the biased electrical contacts provide compressive engagement with the electrical busway.

17. The connection mechanism of claim 8 further comprising a data channel structured to receive a number of data transport devices.

18. The connection mechanism of claim 17 wherein the base plate has a first wall portion that extends generally upwardly from the base plate which is structured to shield the data transport devices from electromagnetic flux generated within the power channel located adjacent to or proximate to the base plate.

19. The connection mechanism of claim 18 further comprising a second wall portion that extends generally upwardly from the base plate, wherein an upper end of the first wall portion has an arcuate tip formed therein, wherein an upper end of the second wall portion has a barb formed therein, and wherein the arcuate tip and the barb are structured to receive barbs of a cover to close the data channel.

20. The connection mechanism of claim 19, wherein the cover has a generally downwardly extending third wall portion, wherein one of the barbs of the cover is located proximate to an upper end of the cover at a lower end of the third wall portion, wherein an upper generally horizontal surface is coupled to the third wall portion, wherein a generally downwardly extending fourth wall portion is coupled to the upper horizontal surface, wherein a lower generally horizontal segment is coupled to the fourth wall portion at a location proximate to a bottom end of the cover, wherein a generally downwardly extending fifth wall portion is coupled to the lower horizontal segment, and wherein the other barb of the cover is located proximate to the bottom end of the cover at a lower end of the fifth wall portion.

21. The connection mechanism of claim 1 wherein the electrical busway has a number of electrical conductors that extend along a length of the base plate, and wherein each of the electrical conductors are located within an insulator.

22. The connection mechanism of claim 21 wherein the insulator includes a number of general U-shaped portions at least some of which are structured to receive one of the number of electrical conductors, wherein each U-shaped portion is coupled to an adjacent U-shaped portion by an insulator generally horizontal segment, wherein each U-shaped portion has a pair of opposed wall sections that define a recess for receiving one of a number of electrical contacts, wherein the base plate has a pair of generally upwardly extending wall portions in opposed relation to each other that have a number of generally inwardly extending tab portions in opposed relation to each other, wherein one of the number of opposed tab portions is structured to receive the insulator and electrical conductors, wherein peripheral edges of the insulator each have a flange formed therein, and wherein each flange is structured to be enclosed by one of the number of tab portions.

23. The power module of claim 21 further comprising a joint insulator wherein the joint insulator includes a number of general U-shaped portions, wherein at least some of the U-shaped portions are structured to receive one of the number of electrical conductors, and wherein each of the number of electrical conductors are located within a general U-shaped portion of the insulator.

24. A connection mechanism in combination with a power module for an electrical busway coupled to a base plate, the combination comprising:

a holder with an aperture provided therein and a number of posts provided thereon; a plug-in adapter received within the aperture of the holder; and a cam mechanism coupled to at least one of the number of posts, wherein the plug-in adapter has a number of electrical contacts, each of the number of electrical contacts is structured to be electrically connected to a conductor of the electrical busway, wherein the cam mechanism has a number of pivotable members, wherein each of the pivotable members has a generally horizontal extending shoulder portion coupled to a generally downwardly extending arm portion, wherein a lower portion of the arm portion has a generally outwardly extending barb portion, wherein the barb portion is structured to engage a barb of the base plate, wherein the holder and the cam mechanism are coupled to a cover plate, wherein the base plate and the cover plate define a power channel, and wherein the plug-in adapter and the cam mechanism are located within the power channel.

25. The combination of claim 24 wherein the cam mechanism further comprises a sloped member located proximate to a lower end of a rotatable fastener that is disposed around a portion of a shank of the rotatable fastener, wherein the rotatable fastener passes through an aperture provided in the cover plate, wherein the rotatable fastener passes through an aperture in a flange of the holder, wherein the rotatable fastener passes through a biasing member, wherein the rotatable fastener passes through an aperture provided in one of the pivotable members, and wherein the rotatable fastener passes through an aperture provided in the sloped member.

26. The combination of claim 25 wherein the pivotable members are spring loaded by the biasing member, and wherein the connection mechanism causes barb portions to snap under barbs of the base plate when the connection mechanism is moved towards the electrical busway.

27. The combination of claim 24 wherein the pivotable members are located on opposite ends of the power module.

28. The combination of claim 24 wherein the cam mechanism further comprises:
a sloped member located proximate to a lower end of a rotatable fastener; and
a sloped nib provided on one of the pivotable members that engages the sloped member,
wherein the sloped member is disposed around a portion of a shank of the rotatable fastener.

29. The combination of claim 28 wherein actuation of the rotatable fastener provides corresponding rotatable movement to the sloped member, and
wherein rotatable movement of the sloped member provides an effective amount of movement in the pivotable members to pull the pivotable members away from barbs of the base plate and disengage the connection mechanism from the electrical busway.

30. The combination of claim 28 wherein the sloped member has indentations which are structured to provide a locking feature.

31. The combination of claim 24 wherein the holder has a base with the aperture provided therein,
wherein the base has a number of walls extending generally upwardly from the base,
wherein an upper end of the holder has generally horizontal extending flanges,
wherein each of the flanges is coupled to one of the number of walls,
wherein each of the flanges has an aperture formed therein for coupling one of a number of connection mechanisms thereto,
wherein some of the number of walls have posts provided thereon, and
wherein the holder is located within the power channel.

32. The combination of claim 31 wherein each of the number of walls stands in opposed relation to one of the other walls, and
wherein the flanges are located in opposed relation to each other.

33. The combination of claim 24 wherein the plug-in adapter is captured within the aperture by a number of tabs which may be actuated to permit removal of the plug-in adapter from the aperture.

34. The combination of claim 24 further comprising:
a plug-in unit received within apertures within the cover plate;
a switch or circuit interrupter received within an aperture within the cover plate; and
a number of wires coupled to the plug-in adapter and one of the plug-in unit and the circuit interrupter.

35. The combination of claim 24 wherein the base plate has a number of locations on the base plate that are structured to receive fasteners in order to directly attach the base plate to a mounting surface.

36. The combination of claim 35 wherein the mounting surface is selected from the group consisting of a wall, a floor and a ceiling.

37. The combination of claim 24 wherein the plug-in adapter has an upper housing and a lower housing that are structured to be coupled together,
wherein the upper housing has tabs for captively receiving the plug-in adapter within the aperture of the holder,
wherein the upper housing has a number of receptacles provided therein that are structured to receive a number of biasing members,
wherein each of the electrical contacts is structured to be coupled to one of the number of biasing members to selectively bias the electrical contacts,
wherein the lower housing has a number of apertures, and
wherein each of the apertures is structured to receive a blade of each of the electrical contacts.

38. The combination of claim 37 wherein the electrical contacts and the biasing members are provided between the upper housing and the lower housing,
wherein the blades protrude from the apertures in the lower housing,
wherein the biasing members are received within the receptacles of the upper housing, and
wherein the biased electrical contacts provide compressive engagement with the electrical busway.

39. The combination of claim 24 further comprising a data channel structured to receive a number of data transport devices.

40. The combination of claim 39 wherein the base plate has a first wall portion that extends generally upwardly from the base plate which is structured to shield the data transport devices from electromagnetic flux generated within the power channel located adjacent to or proximate to the base plate.

41. The combination of claim 40 further comprising a second wall portion that extends generally upwardly from the base plate,
wherein an upper end of the first wall portion has an arcuate tip formed therein,
wherein an upper end of the second wall portion has a barb formed therein,
and wherein the arcuate tip and the barb are structured to receive barbs of a cover to close the data channel.

42. The combination of claim 41, wherein the cover has a generally downwardly extending third wall portion,
wherein one of the barbs of the cover is located proximate to an upper end of the cover at a lower end of the third wall portion,
wherein an upper generally horizontal surface is coupled to the third wall portion,
wherein a generally downwardly extending fourth wall portion is coupled to the upper horizontal surface,
wherein a lower generally horizontal segment is coupled to the fourth wall portion at a location proximate to a bottom end of the cover,
wherein a generally downwardly extending fifth wall portion is coupled to the lower horizontal segment,
and wherein the other barb of the cover is located proximate to the bottom end of the cover at a lower end of the fifth wall portion.

43. The combination of claim 24 wherein the electrical busway has a number of electrical conductors that extend along a length of the base plate, and
wherein each of the electrical conductors are located within an insulator.

44. The combination of claim 43 wherein the insulator includes a number of general U-shaped portions at least some of which are structured to receive one of the number of electrical conductors,
wherein each U-shaped portion is coupled to an adjacent U-shaped portion by an insulator horizontal segment,
wherein each U-shaped portion has a pair of opposed wall sections that define a recess for receiving one of a number of electrical contacts, wherein the base plate has a pair of generally upwardly extending wall portions in opposed relation to each other that have a number of generally inwardly extending tab portions in opposed relation to each other, wherein one of the number of opposed tab portions is structured to receive the insulator and electrical conductors, wherein peripheral edges of the insulator each have a flange formed therein, and wherein each flange is structured to be enclosed by one of the number of tab portions.

45. The combination of claim 43 further comprising a joint insulator wherein the joint insulator includes a number of general U-shaped portions, wherein at least some of the U-shaped portions are structured to receive one of the number of electrical conductors, and wherein each of the number of electrical conductors are located within a general U-shaped portion of the insulator.

* * * * *